Jan. 20, 1959  W. M. TKACHYK ET AL  2,869,895
SHORT HITCH STEERING ASSEMBLY
Filed July 26, 1957 2 Sheets-Sheet 1
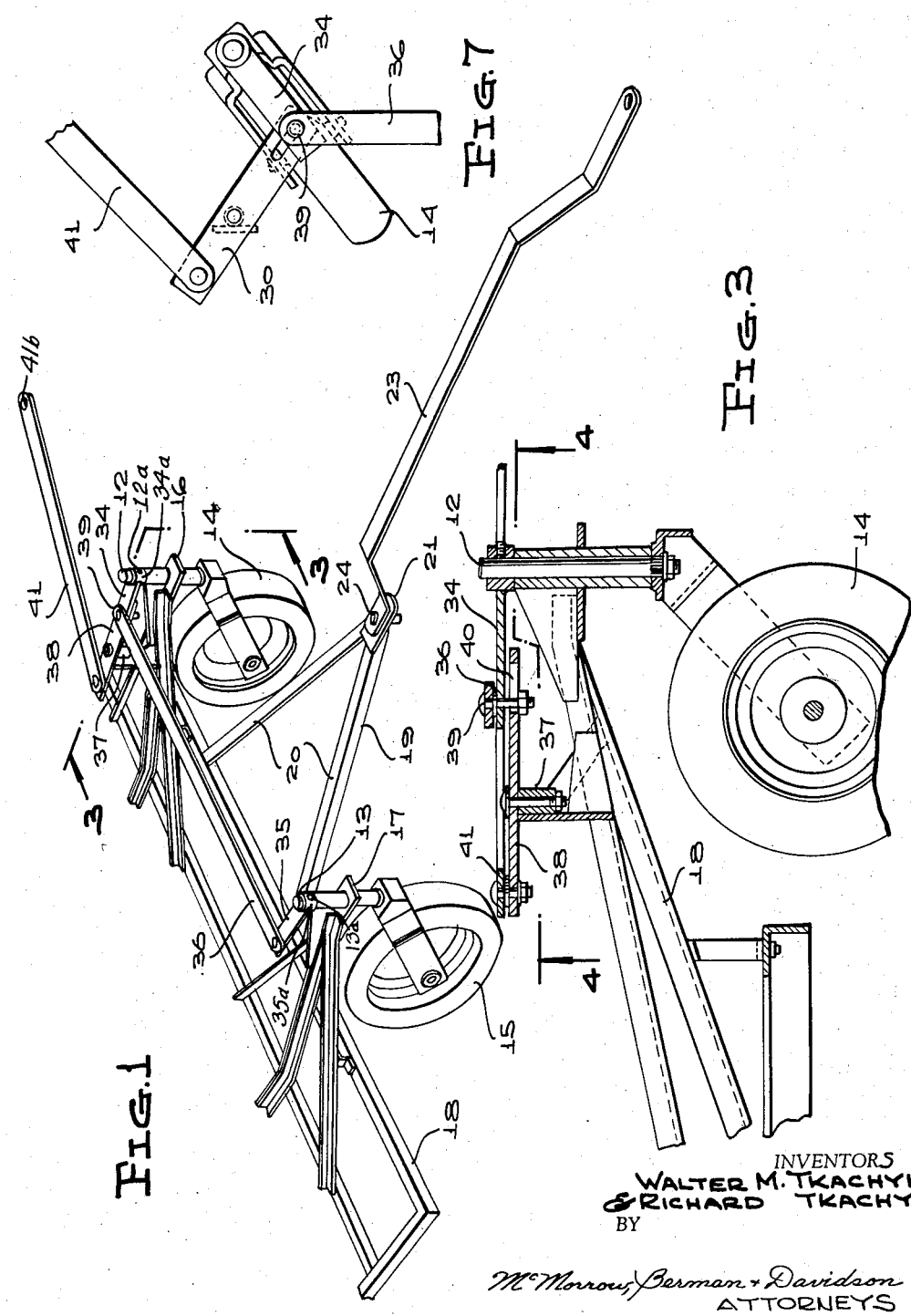
INVENTORS
WALTER M. TKACHYK
& RICHARD TKACHYK
BY
*McMorrow, Berman + Davidson*
ATTORNEYS

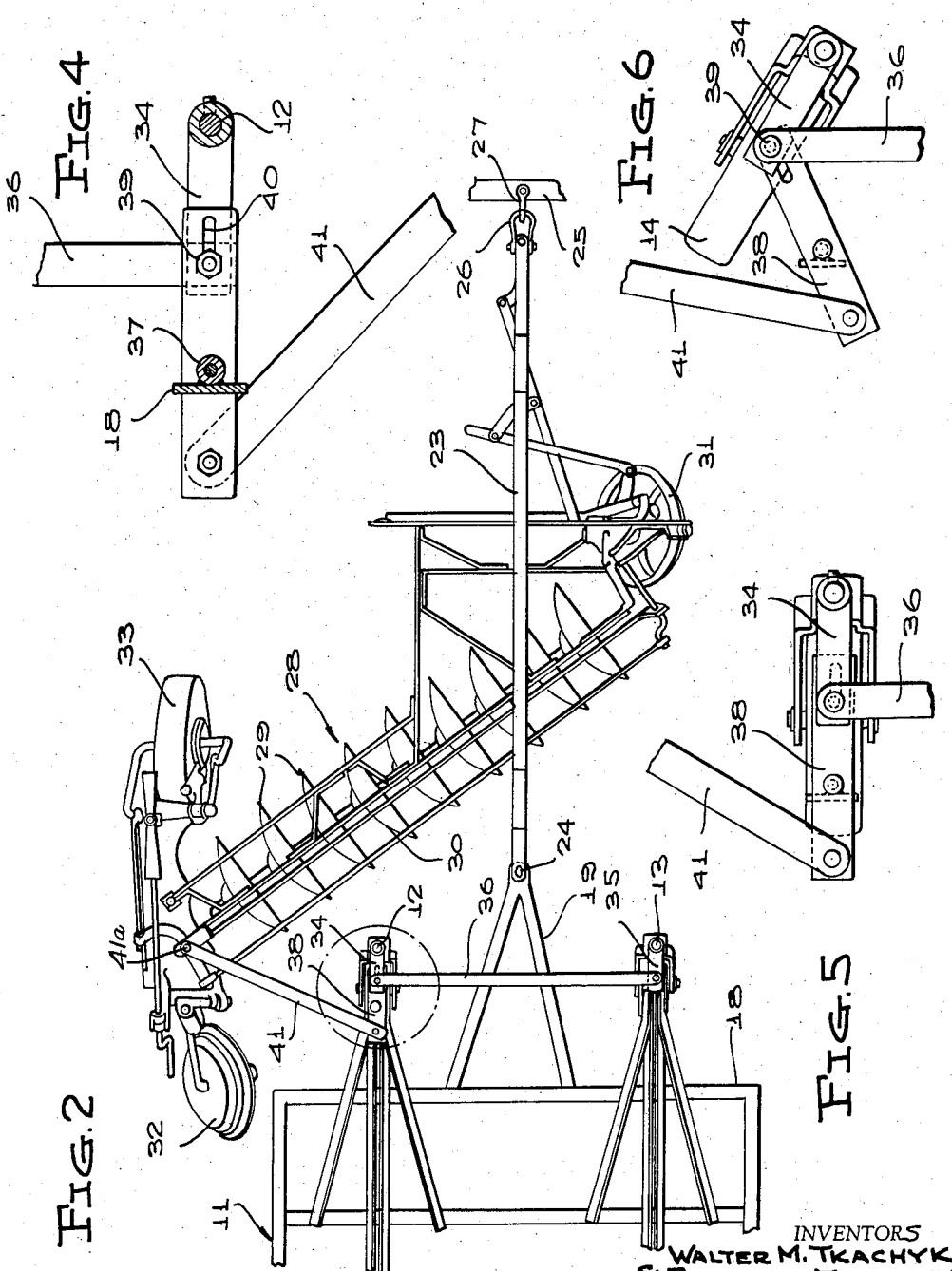

United States Patent Office 2,869,895
Patented Jan. 20, 1959

2,869,895

SHORT HITCH STEERING ASSEMBLY

Walter M. Tkachyk and Richard Tkachyk, Scobey, Mont.

Application July 26, 1957, Serial No. 674,425

2 Claims. (Cl. 280—411)

This invention relates to agricultural equipment, and more particularly to means for connecting a grain drill to a tractor behind a cultivator.

A main object of the invention is to provide a novel and improved hitch means for connecting a grain drill to a tractor behind a cultivator, said hitch means being simple in construction, being easy to install, and enabling the grain drill to be placed a relatively short distance behind the tractor.

A further object of the invention is to provide an improved hitch means for connecting a grain drill to a tractor behind a cultivator, said hitch means involving relatively inexpensive parts, being rugged in construction, and insuring that the grain drill will steer automatically and will follow behind the cultivator without interfering therewith while at the same time being relatively close to the tractor, whereby the efficiency of loading on the tractor is greatly increased, whereby the operator can easily see the feed cups and other parts of the grain drill, reducing slippage between the cultivator and the grain drill, saving tractor fuel, and reducing wear on the various parts of the assembly.

Further objects and advantages of the invention will become apparent from the following description and claims, and from the accompanying drawings, wherein:

Figure 1 is a perspective view of the forward portion of a grain drill provided with improved self-steering hitch means according to the present invention.

Figure 2 is a top plan view showing the forward portion of the grain drill of Figure 1 in the position assumed thereby when it is connected to a tractor behind a cultivator, as contemplated by the present invention.

Figure 3 is an enlarged vertical cross sectional view taken on line 3—3 of Figure 1.

Figure 4 is a horizontal cross sectional view taken on line 4—4 of Figure 3.

Figure 5 is an enlarged top plan view of a portion of the operating linkage of the grain drill hitch means of Figure 1 adjacent one of the vertical caster shafts of the grain drill with the parts in the positions assumed thereby when the grain drill is being pulled in a forward direction.

Figure 6 is a top plan view of the structure of Figure 5 illustrating the positions assumed by the parts when the tractor and cultivator are turning toward the left.

Figure 7 is a top plan view similar to Figure 6 but showing the positions assumed by the parts when the tractor and cultivator are being turned to the right.

Referring to the drawings, 11 designates the forward portion of a conventional grain drill of the type having a pair of vertical caster shafts 12 and 13 at opposite sides of its forward end portion, the caster shafts being associated with the respective caster wheels 14 and 15. As shown in Figure 1, the caster shafts 12 and 13 are journaled in respective bracket members 16 and 17 secured to and projecting forwardly from the frame of the grain drill, designated at 18.

Also rigidly secured to the frame of the grain drill and projecting forwardly therefrom is a forwardly extending generally triangular hitch member 19, comprising a pair of forwardly convergent bars 20, 20 rigidly connected at their forward ends and having a hitch tongue 21 secured thereto.

Designated at 23 is a rigid hitch link bar which is pivotally connected by a vertical pivot pin 24 to the hitch tongue 21 and which is adapted to be connected to the rear end of a tractor, for example, to the transverse draw bar element 25 of the tractor, as shown in Figure 2, in any suitable manner, as by a yoke element 26 engaged with a hitch link 27, the link 27 being secured to the draw bar 24 and the yoke 26 being fastened to the forward end of the hitch link bar 23.

A cultivating attachment 28 of generally conventional construction is also connected to the transverse draw bar element 25 of the tractor, by conventional hitch means, forming no part of the present invention. Thus, the cultivator attachment 28 is located between the grain drill 11 and the rear end of the tractor.

As shown in Figure 2, the cultivator attachment 28 is of the type having a plurality of cultivating discs 29 which are mounted on a diagonally extending shaft 30, the attachment being supported at one side by a ground-engaging wheel 31 which is positioned a substantial distance forwardly of the corresponding ground-engaging wheel 32 at the opposite side of the cultivator and is located forwardly of the additional tread wheel 33 provided on the cultivator at the same side of the ground-engaging wheel 32. It will be readily apparent that the feed drill ordinarily would interfere with the cultivator 28 when the tractor and cultivator makes a left turn in a forward direction, as viewed in Figure 2, in view of the relatively short distance between the rear wheel 32 and the frame of the grain drill. However, by means of the hitch mechanism of the present invention, such interference is avoided and the tractor and parts connected thereto are enabled to turn in either direction with complete freedom from interference with each other.

The hitch link bar 23 does not necessarily have to be connected to the draw bar element 25 of the tractor but may be connected to any convenient portion of the cultivating attachment 28 between the yoke element 26 and the main frame of the cultivating attachment at a point above the cultivating discs 29.

Secured rigidly to the top end portions of the respective caster shafts 12 and 13 are respective rearwardly extending steering arms 34 and 35 which are arranged substantially parallel to each other and which are connected together at their rear end portions by a transversely extending steering link 36, whereby the steering arms 34 and 35 are coupled together for simultaneous steering movement. The front end portions of the arms 34 and 35 are provided with means for securing the arms in parallel relation to the respective vertical caster shafts 12 and 13, said means comprising sleeves 34a and 35a which embracingly receive the top portions of the respective shafts 12 and 13, and are attached to the top portions of the shafts 12 and 13 by means of pins 12a and 13a respectively. Rigidly secured to the frame 18 of the grain drill behind the caster shaft 12 and spaced therefrom is an upstanding supporting post member 37, and pivoted at its intermediate portion to the top end of said post member is a lever 38. The forward end of the lever is slidably and pivotally connected to the rear end portion of the steering arm 34, as by a vertical pin 39, which also provides the pivotal connection between the transverse link bar 36 and the arm 34. As shown in Figure 3, the lever 38 is formed with a longitudinal slot 40 through which the pivot pin 39 extends, thus providing the pivotal and slidable connection between arm 34 and lever 38.

The rear end portion of lever 38 is pivotally connected to one end of an outwardly and forwardly extending link bar 41. Means pivotally connects the other end of the link bar 41 to the adjacent side portion of the cultivator 28, said means embodying a pivot pin 41a projecting through an aperture 41b formed in the other end of the link bar 41, the pivot pin 41a being supported in the side portion of the frame of the cultivator 28. By this connection of the link bar 41 to the lever 38 and to the frame of the cultivator 28 turning movements of the cultivator are transmitted by the link bar 41 to the steering mechanism of the grain drill in a manner presently to be described.

As shown in Figure 5, when the tractor, cultivator and grain drill are proceeding forwardly without turning, the lever 38 is substantially longitudinally aligned with the rearwardly extending steering arm 34 and the transverse link bar 36 is substantially at right angles to said arm 34. When the tractor and cultivator are turning to the left, as illustrated in Figure 6, an inward thrust is transmitted by the link bar 41 to the lever 38, causing said lever 38 to rotate counterclockwise, as viewed in Figures 5 and 6, and thus causing the steering arm 34 to rotate clockwise. This causes the steering arm 35 to also rotate clockwise simultaneously with the steering arm 34, whereby the caster wheels 14 and 15 are rotated in a clockwise direction, as viewed in Figures 5 and 6, namely, in a direction reverse to that in which the cultivator is turning. This tends to swing the grain drill 11 laterally away from the rear end portion of the cultivator 28, and to cause the grain drill to follow the cultivator but in a path of movement laterally offset by an amount depending upon the sharpness of the turn being made. As will be apparent from Figure 2, the turning force is developed by the cooperation of the tension transmitted from the tractor to the grain drill frame 18 through the link member 23 and the steering action transmitted to the hitch members of the grain drill by the steering link bar 41. Considering Figure 2 and Figure 6 in the light of the above description, it will be apparent that when the cultivator and tractor are turning to the left, the grain drill 11 will follow, but will first move laterally away from the rear end portion of the cultivator in a direction toward the opposite ground-engaging wheel 31 of the cultivator, thus providing the necessary clearance between the grain drill and the cultivator required to make the turn without interference.

In making a right turn the above action is reversed, and the link bar 41 is placed in tension, causing the lever 38 to be rotated in a clockwise direction from the position thereof shown in Figure 5, as is illustrated in Figure 7, thus causing the steering arm 34 to be rotated counterclockwise from the position thereof in Figure 5, whereby the caster wheels 14 and 15 are rotated counterclockwise. This shifts the grain drill laterally in a direction toward the rear wheel 32 of the cultivator, but since the cultivator is now swinging in a clockwise direction, as viewed in Figure 2 in order to make the right turn, there is no danger of interference between the cultivator and the grain drill. The link bar 41 acts as a regulator to control the steering linkage of the grain drill to always insure that turns in either direction will be made by the members drawn by the tractor without interfering with each other.

While the short hitch steering assembly of the present invention has been described above as employed on a press grain drill having two caster wheels, it can also be used on drills equipped with a tongue truck, single caster wheel and auto steering trucks; in these applications the parts are somewhat different and are positioned differently, but the same principle is used.

While a specific embodiment of an improved hitch means for connecting a grain drill to a tractor behind a cultivator has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination with a grain drill having vertical caster shafts at its opposite sides and a forwardly extending hitch member extending between the caster shafts and rigid with the frame of the drill, hitch means for connecting the grain drill to a tractor behind a cultivator comprising respective rearwardly extending steering arms secured to the caster shafts and in parallel relation, a transverse link arm connecting said steering arms, a lever pivoted at its intermediate portion to the grain drill rearwardly adjacent one of the caster shafts, means pivotally and slidably connecting the forward end of the lever to the adjacent steering arm, a link bar pivoted to the rear end of said lever, means for pivotally connecting the link bar to the adjacent side portion of the cultivator, and a hitch link member pivotally connected to the forward end of the hitch member and adapted to be connected to the tractor, whereby turning movement of the cultivator in one direction causes simultaneous reverse turning movement of the caster shafts.

2. In combination, a tractor, a cultivator connected to the tractor, a grain drill disposed behind the cultivator, vertical caster shafts on said grain drill located at the opposite sides thereof, a forwardly extending hitch member on said grain drill extending between the shafts and rigid with the frame of the drill, rearwardly extending steering arms secured to the caster shafts in parallel relation, a transverse link bar connecting said steering arms, a lever pivoted at its intermediate portion to the grain drill rearwardly adjacent one of the caster shafts, means pivotally and slidably connecting the forward end of the lever to the adjacent steering arm, a link bar pivoted to the rear end of said lever, means pivotally connecting the link bar to the adjacent side portion of the cultivator, and a hitch link member pivotally connected at its rear end to the forward end of the hitch member and pivotally connected at its forward end to the rear end portion of the tractor, whereby turning movement of the tractor and cultivator in one direction causes simultaneous reverse turning movement of the caster shafts of the grain drill.

References Cited in the file of this patent

UNITED STATES PATENTS

| | | |
|---|---|---|
| 2,065,015 | Nielsen | Dec. 22, 1936 |
| 2,258,678 | Elwood | Oct. 14, 1941 |
| 2,702,193 | Taylor et al. | Feb. 15, 1955 |